Nov. 19, 1963    F. STERRY ETAL    3,111,476
CORE ELEMENTS FOR NUCLEAR REACTORS
Filed May 7, 1959
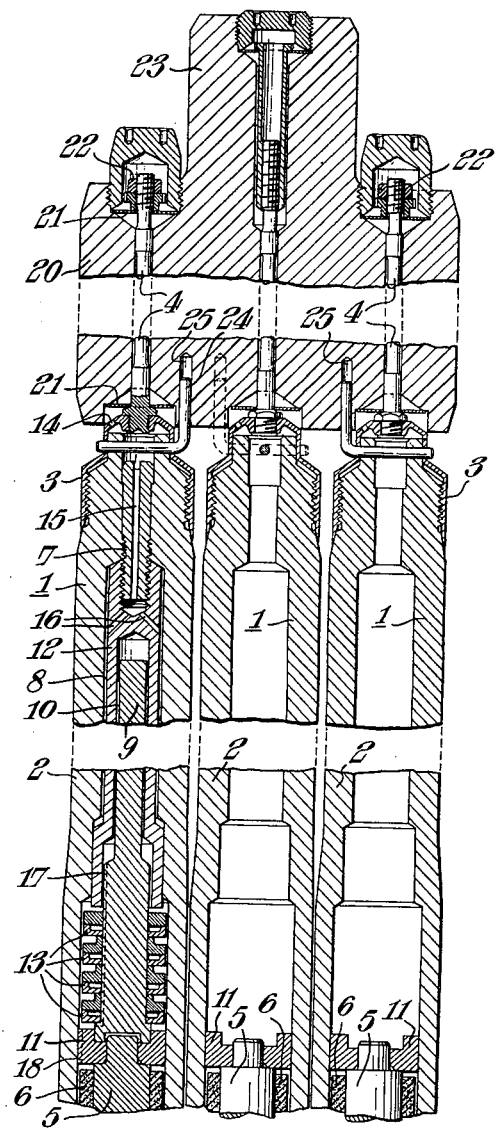
INVENTORS—
FRANK STERRY
GEORGE EDWARD LOCKETT
BY *Larson and Taylor*

3,111,476
CORE ELEMENTS FOR NUCLEAR REACTORS
Frank Sterry, Upper Basildon, and George Edward Lockett, Abingdon, England, assignors to United Kingdom Atomic Energy Authority, London, England
Filed May 7, 1959, Ser. No. 811,737
Claims priority, application Great Britain May 14, 1958
3 Claims. (Cl. 204—193.2)

This invention relates to core elements for nuclear reactors and has one application in core elements of the type described in U.S. Patent 3,039,947, issued June 19, 1962.

In the latter specification a core element is described comprising a tubular container of graphite having axially located within it a graphite rod and sleeves containing fissile material located in the annular space between the container wall and the rod. A feature of this fuel element is the provision of a passage at the lower end of the element for continuously drawing off volatile fission products produced within the element during operation of the reactor.

The gas drawn off through this passage consists of a mixture of volatile fission products, plus coolant gas, e.g. helium, which has entered through the container wall. The fission products are separated out e.g. by cold trapping, and the coolant gas returned to the main circuit. In order to reduce the amount of gas to be handled by the separation plant, it is desirable to keep down the amount of coolant entering the container and therefore to use for the wall thereof a grade of graphite having a low permeability. With the kinds of low-permeability graphite at present available, e.g. Morgan Crucible Co. Type EY 9, the amount of coolant entering the container can be reduced to an acceptable level, but back-diffusion of the fission products through the wall into the coolant stream results in an undesirable degree of contamination of the coolant circuit. Back-diffusion is the name given to the process by which the fission products diffuse outwards through the graphite pores against the inward flow of coolant gas through the pores. It is an object of the present invention to reduce the contamination caused by this back-diffusion effect.

An ideal solution of the back-diffusion difficulty would be to make the container wall of graphite of such low permeability that the fission products could not diffuse out, but such graphites are not yet available. The permeability of EY 9 graphite can be further reduced by impregnation in the manner described in the specification of copending application Serial No. 775,121 filed November 20, 1958, but paradoxically it is found that such reduction does not necessarily reduce the back-diffusion, which may actually increase. This is because as the permeability (or pore size) is reduced the inward viscous flow of coolant through the pores falls more rapidly than does the outward molecular diffusion of fission products, so that the "flushing-back" action of the coolant flow on the fission products is lost. In the absence of inward viscous flow, the diffusion rate depends only on the relative fission product concentrations inside and outside the container.

According to the present invention in a core element comprising a container having a wall of neutron moderating material of low gas permeability and means for drawing off volatile fission products produced within the container, there is provided a controlled leak means whereby a limited quantity of coolant gas may enter the container at a rate high enough to dilute the volatile fission products and so reduce the amount of said products which diffuse through the wall, said leak means being of such dimensions and/or permeability, as to inhibit back-diffusion through the leak means.

The wall may be made of low-permeability graphite and the controlled leak means may comprise a plug made of graphite whose permeability is high compared with the wall.

To enable the nature of the invention to be more readily understood, attention is directed by way of example to the accompanying drawing, which is a longitudinal cross-section of the upper portion of a cluster of core elements according to the invention.

The cluster construction shown in the drawing is basicaly similar to that described in the aforementioned U.S. Patent 3,039,947. As in the latter case each cluster consists of seven core elements 1, three of which are shown in the drawing, fastened to a top spider 20. Each element comprises an outer tube 2 of hexagonal cross-section made of low permeability graphite e.g. Morgan EY 9 treated as described in the specification of copending application Serial No. 775,121 filed November 20, 1958, the upper end of which screws into the cupped head 3 of a stainless steel bolt 4. Axially located within the tube 2 is a plurality of fuel supporting rod sections 5, each section carrying a plurality of graphite sleeves 6 which contain fissile material, (only the upper ends of the uppermost rod section 5 and of the uppermost sleeve 6 are shown in the drawing). The construction of the lower end of the cluster is substantially the same as that described in the aforementioned U.S. Patent 3,039,947.

Within the upper end of each tube 2 a tubular porous plug 12 is secured by a graphite bolt 7. The plug 12 is made of relatively high permeability graphite, e.g. "pile" graphite, and is dimensioned to leave a small annular space 8 between the inner surface of the tube 2 and the outer surface of the plug 12. The interior of the plug 12 is filled by a low permeability graphite rod 9 dimensioned to leave a small annular space 10 between the inner surface of the plug 12 and the outer surface of the rod 9. The ratio of plug length to plug outer diameter is about 10:1 in the present embodiment, the dimensions being such as to give a flow area to thickness ratio of 275 cm.$^2$/cm.

The lower end of the rod 9 rests on a centralising block 11 which engages a spigot on the upper end of rod section 5. Space is left for the rod 9 to slide further into the plug 12 if the rod sections 5 should grow longitudinally under irradiation, crushable graphite spacers 13 being provided between a shoulder on the rod 9 and the lower surface of the plug 12 to allow such movement to take place.

The coolant gas enters the element through a hole 14 in the cupped head 3, thence passes down a hole 15 in the bolt 7 and through passages 16 in the plug 12 into the space 8, and flows through the plug into the space 10. Thereafter it passes down slots 17 and 18 in the lower end of the rod 9 and in the block 11 respectively and so gains access to that part of the element containing the fissile material. The flow of coolant gas through the element 1 can be made sufficient to dilute the volatile fission product concentration within it and thus reduce the amount of fission products diffusing through the tube 2, without providing an undue volume of coolant gas for the fission product separation plant to handle.

To minimise back-diffusion through the plug assembly, hole 15 is dimensioned to ensure an adequately high flow velocity in the forward direction. The same is done at the lower end of the plug by suitably dimensioning the passages 17 and 18.

Each element 1 is secured to the graphite top spider 20 by the bolts 4 and nuts 22 and is located endwise with respect to the spider by steel washers 21. These steel washers serve to accommodate differences between the longitudinal expansions of the separate elements forming a cluster. Minor differences are satisfied by elastic deflections of the washers, but appreciable irregular growth or contraction causes any overloaded washers to yield, since they soften at the working temperature of the elements. Thus each element can move relative to the spider without setting up excessive resisting forces. The washers harden when the elements are cold and carry the thrust load when the cluster is being withdrawn from the reactor core by grappling means attached to an extension 23 of the top spider.

Each cupped head 3 is fitted with a steel locating spigot 24 which engages in a hole 25 in the top spider.

We claim:

1. In a core element for a nuclear reactor wherein a gaseous coolant is circulated around said element which comprises a fuel container having a wall of neutron moderating material of low gas permeability and means for drawing off volatile fission products produced within the container, the improvement comprising back diffusion inhibiting means comprising a coolant gas inlet plug of higher permeability than the container wall and extending between the interior of the container and the coolant gas space surrounding the core element.

2. A core element as claimed in claim 1 in which the coolant gas inlet plug is apertured to form at least one small bore gas passage.

3. In a core element for a nuclear reactor wherein a gaseous coolant is circulated around said element comprising a fuel container having a wall of neutron moderating material of flow gas permeability and suction means connected to the interior of said container, the provision of back diffusion inhibiting means comprising a coolant gas inlet plug of hollow cylindrical form, of high permeability relative to the container wall and between the interior of the container and the coolant gas space surrounding the core element whereby coolant gas permeates radially through the plug into the container.

References Cited in the file of this patent

UNITED STATES PATENTS

| | | |
|---|---|---|
| 2,799,642 | Hurwitz et al. | July 16, 1957 |
| 2,851,409 | Moore | Sept. 9, 1958 |

FOREIGN PATENTS

| | | |
|---|---|---|
| 809,586 | Great Britain | Feb. 25, 1959 |